UNITED STATES PATENT OFFICE.

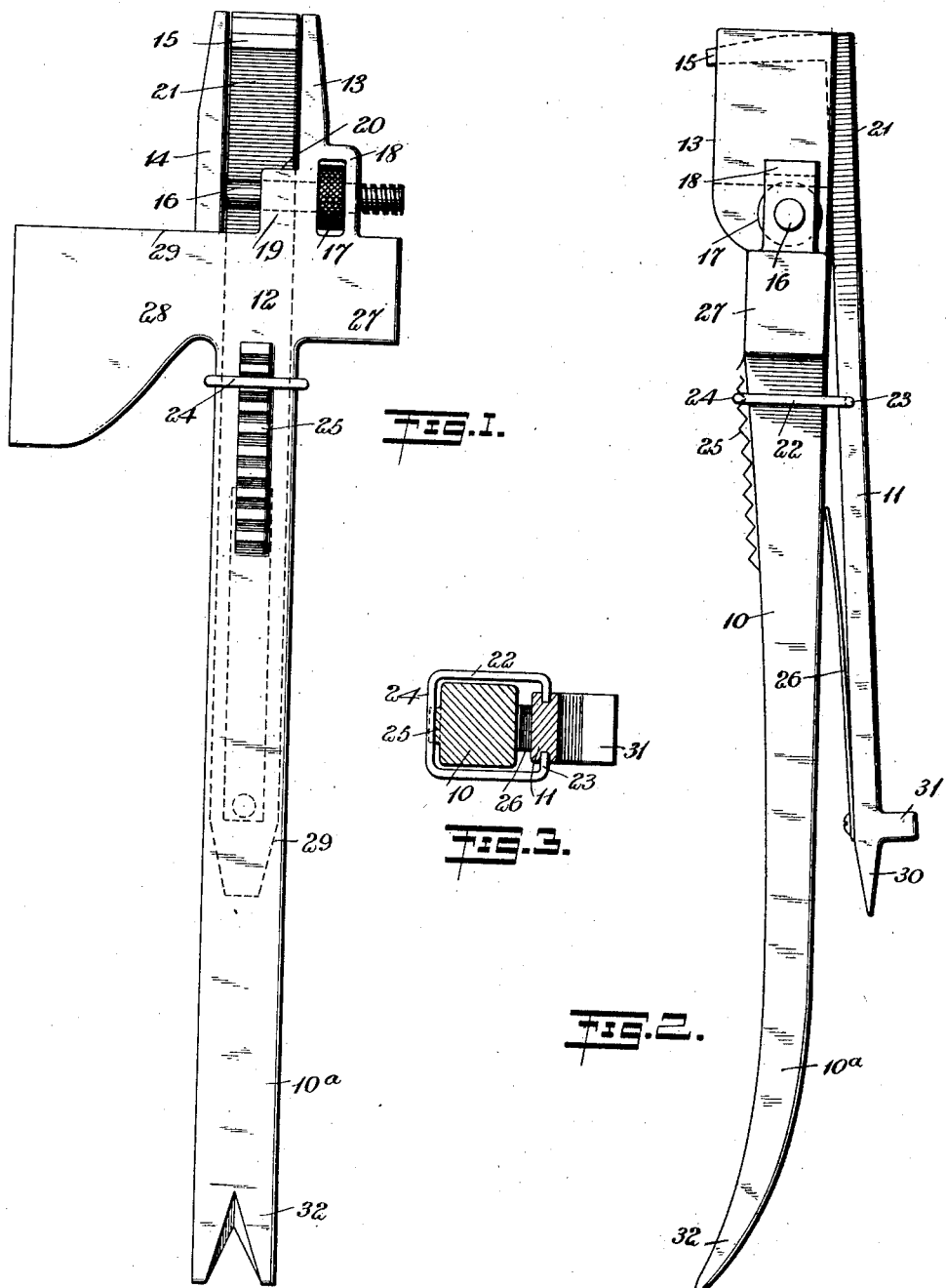

LOUIS B. SMITH, OF LEWISTOWN, MONTANA.

COMBINATION-TOOL.

1,113,844.

Specification of Letters Patent. Patented Oct. 13, 1914.

Application filed January 21, 1914. Serial No. 813,427.

*To all whom it may concern:*

Be it known that I, LOUIS B. SMITH, a citizen of the United States, and a resident of Lewistown, in the county of Fergus and State of Montana, have invented a new and Improved Combination-Tool, of which the following is a full, clear, and exact description.

My invention relates to a combination tool involving primarily a wagon or buggy wrench of novel form adjustable to adapt it to nuts or burs of different sizes.

Associated with the shanks of the wrench in practice, and coacting therewith, are formed different tools, as hereinafter more particularly explained.

Reference is to be had to the accompanying drawings forming a part of this specification, in which similar characters of reference indicate corresponding parts in all the views.

Figure 1 is a face view of a tool constructed in accordance with my invention; Fig. 2 is a side elevation thereof; and Fig. 3 is a cross section through the shanks of the tool.

In constructing a tool in accordance with my invention, a main shank 10 is provided, and an auxiliary shank 11 slidable on the main shank 10 in a manner hereinafter described. The main shank is provided rearward of its free end with a head 12, which in practice, is formed with hatchet elements, as hereinafter particularly explained. In front of the head 12 elements are provided on the fixed shank to constitute wrench jaws, there being a fixed side wall 13 projecting forwardly and an opposite side wall 14 adjustable toward and from the fixed wall 13. At the front end of the auxiliary shank 11 a third jaw 15 is provided projecting laterally from the shank adjacent to the ends of the walls 13, 14. The wall 14 has a lateral stem 16 which is threaded near its outer end, and receives an adjusting nut 17, the nut being disposed in a loop 18 at the front of the head 12. At the base of the fixed wall 13 an enlargement 19 is provided, affording a substantial bearing for the stem or pin 16. The front surface 20 of said enlargement constitutes a lateral shoulder at the base of the wall 13, the shoulder forming the inner wall of the box-like inclosure produced by the jaw elements.

The movable shank 11 on which the jaw 15 is formed extends as at 21 at the back of the box-like inclosure. On said shank rearward of the head 12 is a loop or yoke 22, the inturned ends 23 of which enter opposite sides of the shank 11. Said loop embraces the main shank 10 and the cross-bar 24 of the loop is adapted to adjustably engage a rack 25 on the main shank. A spring 26, here shown as a plate spring, is secured to the auxiliary shank 11 and bears by its free end against the back of the main shank, tending to rock the auxiliary shank on the loop 22 as a pivot.

The head 12 is formed with laterally projecting members 27 and 28 projecting at opposite sides of the main shank, said elements in practice constituting hatchet elements, the member 27 at one side being in the form of a poll, and the member 28 at the opposite side being in the form of a hatchet blade. The front surface or edge 29 on the blade 28 forms a seat for the inner end of the movable wall 14, so that in the operation of the wrench the strain to which the wall 14 is subjected will be resisted by the contact of the inner end of the wall with the surface 29. The laterally projecting members 27, 28, present at their rear sides shoulders which form stops limiting the forward movement of the loop 22 in sliding the shank 11 forwardly.

The rear ends of the main and auxiliary shanks are formed into additional tools, the auxiliary shank being formed at its end into a screw driver 30, and adjacent to said screw driver a poll 31 is provided, which may constitute a hammer. The main shank is preferably curved laterally as at 10ª, and its end formed into a claw 32 which may be employed as a nail puller.

In use the movable wall 14 is adjusted toward or from the opposite side wall 13 by turning the nut 17, and the jaw 15 may be moved backward or forward toward or from the inner wall or shoulder 20, by sliding the auxiliary shank 11 on the main shank. The spring 26 and yoke 22 permit the auxiliary shank to be rocked and in doing so the jaw 15 is retracted from the front or open side of the box-like inclosure for the nut, to facilitate the entrance of the nut, and upon the release of the auxiliary shank the spring projects the jaw 15 again forwardly.

Having thus described my invention, I claim as new and desire to secure by Letters Patent:

1. In a wrench, a main shank having jaw elements comprising a fixed wall, and a wall movable toward and from the fixed wall, and an auxiliary shank slidable on the main shank and having a jaw forming an end wall at the outer ends of the walls on the main shank and movable forward and back with the sliding of the said auxiliary shank.

2. In a wrench, a main shank having jaw elements comprising a forwardly projecting fixed wall at one side, a forwardly projecting movable wall opposite the fixed wall and adjustable toward and from the latter, there being a lateral shoulder between the said walls at the base of one of said walls; and a second shank slidable on the main shank and having a lateral jaw forming a main wall disposed across the front of the space between the side walls of the main shank.

3. In a wrench, a main shank having elements comprising a forwardly projecting fixed wall, and a second forwardly projecting wall movable toward and from the fixed wall, an auxiliary shank slidable on the main shank and having a jaw forming an end wall at the outer ends of the walls on the main shank, a loop on which the auxiliary shank has rocking movement, said loop embracing the main shank, a rack on the main shank with which the loop is adapted to engage, and a spring between the shanks.

4. In a tool of the character described, a main shank having laterally disposed elements at opposite sides of the shank rearward of the front end, jaw elements on the main shank projecting forwardly in front of the said laterally disposed elements, the said jaw elements comprising a fixed side wall and an opposite movable wall resting at its base against the forward side of the adjacent laterally disposed element and having a member adjustably mounted at the base of the fixed wall, an auxiliary shank slidable on the main shank and formed with a lateral jaw forming an end wall at the outer ends of the walls on the main shank, a loop carried by the auxiliary shank and embracing the main shank rearward of the laterally disposed elements, and a rack on the main shank engageable by said loop.

In testimony whereof I have signed my name to this specification in the presence of two subscribing witnesses.

LOUIS B. SMITH.

Witnesses:
W. W. ALLINGHAM,
H. ROUSE.

Copies of this patent may be obtained for five cents each, by addressing the "Commissioner of Patents, Washington, D. C."